June 1, 1915.

DRAWING

476

A careful search has been made this day for the original drawing or a photolithographic copy of the same, for the purpose of reproducing the said drawing to form a part of this book, but at this time nothing can be found from which a reproduction can be made.

Finis D. Morris,
Chief of Division E.

AWK.

UNITED STATES PATENT OFFICE.

BANCROFT WOODCOCK, OF MOUNT PLEASANT, PENNSYLVANIA.

PLOW.

Specification forming part of Letters Patent No. 476, dated June 14, 1837; Reissued November 23, 1837.

*To all whom it may concern:*

Be it known that I, BANCROFT WOODCOCK, of Mount Pleasant, in the county of Westmoreland and State of Pennsylvania, have invented certain Improvements in Plows; and I do hereby declare that the following is a full and exact description thereof.

The share which I use is the same in its general form as that described by me in the specification annexed to Letters Patent granted to me on the twenty third day of November 1836, but it differs therefrom in its transverse section $a$, $b$, Fig. 2, through the part represented by the dotted line $a$, $b$, Fig. 1. The face on each side has its surface flat from each cutting edge to a shoulder represented by the line $c$, $d$ on one side and on the opposite side by the dotted line $e$ $f$. By this means I am enabled to make the share so thin throughout its width that, as it wears up toward the mold board, it is still sufficiently so on its edge to pass freely through the ground. It has two holes $x$, $x$, through it by the one or the other of which it is bolted to the mold board. Fig. 3, is a view of the land side of my plow within a recess or depression in which I place a reversing cutter $g$, $g$, $g$, the general form of which is that of a triangle either end of which may be turned forward, so as to constitute the cutting edge formed by the junction of the mold board and land side of the plow. This reversing cutter may be fastened in its place by making it hollow so as to receive the part, $h$, of the land side allowing space enough between the piece $h$ and the cutter to insert a wedge or wedges $i$. The edges of $h$ are made dovetailing or beveled to clip the inner edges of $g$ and hold it firmly against the land side when wedged. One of the edges of $g$ may reach to the bottom of the land side, or it may stand a little above it, having the strip of iron below it, which strip in this case forms a side of the recess.

I have also made an improvement in the manner of making the renewable point. For the mode in which I formedly made it, I refer to the description thereof in the Letters Patent above named. I now prepare a V formed piece of iron or steel which fits on to the shank K Fig. 3 embracing it on both sides as shown at $l$, $l$, and fastened to it by a rivet passing through the whole. The renewable point is thus rendered more permanent than upon the former plan and the shank is perfectly protected from grinding out in wear. In order to secure the land side to the mold board, I cast the fitting part with dovetail junctures in such a way as that when secured together by wedges passed between checks adapted to that purpose. The parts interlock and are retained firmly in their places. To secure the reversing cutter $g$, $g$, $g$, the more firmly to its place, I form the shank on which the renewable point is placed with a dovetailing angle on each side as shown at $m$, $m$, in the top view of it, Fig. 4. By being so formed, it clips upon the beveled end of $g$, $g$, $g$, and consequently over the inner land side, or that part of the plow, being the cutter $g$, $g$, $g$, and the mold board, and holds the cutter firmly against and close in contact with the part beneath it; an arrangement which gives great stability thereto.

What I claim in reference to the share is—

1. The making it with plain surfaces instead of curved ones, in the manner described, containing such surfaces, shoulder on each side, so as to leave the metal throughout so thin that when it wears off by use, the share will still present a thin edge to the ground.

2. I claim also the reversing cutter received into a recess on the land side, and capable of having either of its edges presented forward so as to form the cutting edge of the plow, and secured in its place on the land side by a wedge or wedges or in any other manner which may be preferred.

3. I likewise claim the mode of forming the renewable point as herein specially set forth and the dovetailed or acute angular form given to the shank of the renewable point, for the purpose of clasping and holding down the reversible cutter.

BANCROFT WOODCOCK.

Witnesses:
    LINTON THORN,
    W. THOMPSON.

[FIRST PRINTED 1914.]